(12) United States Patent
Gans

(10) Patent No.: US 7,429,086 B2
(45) Date of Patent: Sep. 30, 2008

(54) SLEEVE FOR A NECK REST WITH TOLERANCE COMPENSATION

(75) Inventor: Matthias Gans, Würzburg (DE)

(73) Assignee: ITW Automotive Products GmbH & Co KG, Iserlohn, DE (US)

( * ) Notice: Subject to any disclaimer, the term of this patent is extended or adjusted under 35 U.S.C. 154(b) by 366 days.

(21) Appl. No.: 11/156,562

(22) Filed: Jun. 21, 2005

(65) Prior Publication Data

US 2006/0012225 A1   Jan. 19, 2006

(30) Foreign Application Priority Data

Jun. 22, 2004   (DE) .................. 20 2004 009 769 U

(51) Int. Cl.
*B60R 22/29* (2006.01)
(52) U.S. Cl. .................... 297/463.1; 297/410
(58) Field of Classification Search ............. 297/410, 297/463.1, 463.2, 391, 404
See application file for complete search history.

(56) References Cited

U.S. PATENT DOCUMENTS

| 4,674,796 | A | * | 6/1987 | Weinich et al. ............. 297/391 |
| 5,180,207 | A | * | 1/1993 | Schmidt ..................... 297/408 |
| 5,529,379 | A | * | 6/1996 | Stocker ...................... 297/410 |
| 6,874,854 | B2 | * | 4/2005 | Terrand et al. .............. 297/410 |
| 2006/0061188 | A1 | * | 3/2006 | Locke et al. ................ 297/410 |

* cited by examiner

*Primary Examiner*—Milton Nelson, Jr.
(74) *Attorney, Agent, or Firm*—Lowe, Hauptman, Ham & Berner, LLP

(57) ABSTRACT

A sleeve for a neck rest with tolerance compensation, includes a sleeve body of plastic material for the accommodation of a rod of the neck rest. The sleeve body includes at least one integrally formed resilient portion which is biased toward or away from the interior of the sleeve body. A wire portion is attached to the sleeve body parallel to the axis of the sleeve body such that the wire portion can be resiliently deflected away from or towards the sleeve body, the wire portion engaging the resilient portion.

12 Claims, 2 Drawing Sheets

SLEEVE FOR A NECK REST WITH TOLERANCE COMPENSATION

RELATED APPLICATIONS

The present application is based on, and claims priority from, German Application Number 20 2004 009 769.9, filed Jun. 22, 2004, the disclosure of which is hereby incorporated by reference herein in its entirety.

FIELD OF THE INVENTION

The invention relates to a sleeve for a neck rest with tolerance compensation according to.

BACKGROUND OF THE INVENTION

It is known that sleeves for neck rests serve for receiving neck rest bars of a neck rest which is attached to seat backs of automobile seats. The sleeves for neck rests are usually provided with means to lock the neck rest bars at different levels. Further, means are provided to eliminate the locked position. The neck rest bars have am integrally formed neck rest body which is composed of an elongate sleeve portion and an upper radial flange portion which comes to bear against the upper side of the seat back when the sleeve for the neck rest is introduced into the seat back. The flange portion frequently has mounted therein a spring which cooperates with catch recesses of the neck rest bars in order to lock them.

The sleeve for the neck rest, in turn, is received in a respective receptacle in the seat back. The receptacle can consist of a tubular piece which is inserted into the seat back. Alternatively, other receptacle constructions may be provided which receive the sleeve for the neck rest.

Both the interior of the sleeve for the neck rest and the outer contour are subjected to tolerances. The neck rest bars and the receptacles in the backs of the seats also feature tolerances. Therefore, care should be taken to provide for an adequate tolerance compensation. In this context, it is known to form a resilient portion integrally with the neck rest body that extends into the interior of the sleeve for the neck rest if a neck rest bar is not introduced. If the bar is introduced the resilient portion will be deformed outwardly and applies a respective pressure to the neck rest bar. As a result, a tolerance compensation is obtained in the interior of the sleeve for the neck rest. Similarly, known sleeves for neck rests provide at least one outer resilient portion which cooperates with the neck rest receptacle when the sleeve for the neck rest is introduced into the receptacle. The disadvantage of such resilient portions is that they gradually lose their resilience property, particularly during temperature variations. The same is the case when ribs or similar protrusions are provided which radially extend into the sleeve for the neck rest or project from their outer side and are supposed to ensure a tolerance compensation. Such protrusions will flow away at higher temperatures and backlash-free tuning is no longer possible.

It is further known to mount metallic springs on the neck rest body which cooperate with the neck rest bar or neck rest receptacle. The disadvantage of metallic springs is that they involve efforts in manufacture and develop noise when in use.

SUMMARY OF THE INVENTION

It is the object of the invention to provide a tolerance compensation for sleeves for neck rests that is permanently effective and causes a very small effort.

In an aspect of a neck rest, a wire portion made of resilient metal is mounted in parallel with the axis of the sleeve body at the outer side such that a wire portion can be resiliently deflected away from the sleeve body. The wire portion is located at the outer side of the resilient portion. The wire portion, e.g. of circular steel wire, is extremely easy to manufacture as it is cut off from an endless wire. The wire is appropriately attached to the outer side of the sleeve body and serves as a spring supporting the resilient portion which, in turn, bears on the neck rest bar. It is completely unnecessary here to take into account the inherent elastic force of the resilient portion. The resilient portion, in turn, need merely be elastically deformable because the biasing force proper is applied by the wire portion.

In a further aspect, a wire portion is used as well, which engages the inner side of a resilient portion so as to enable it to be biased outwardly against the seat of the sleeve body.

It is preferred to provide at least two spaced resilient portions both during the tolerance compensation of the inner diameter of the sleeve body and during the tolerance compensation of the outer diameter in a longitudinal direction. According to the invention, only a single wire portion is provided the end portions of which cooperate with the resilient portions and which is located between the ends on the neck rest body.

According to an aspect of the invention, it is preferred that the wire portion be clippingly located by portions at the outer side of the sleeve body. For example, according to an aspect of the invention, a hook shaped portion extending transverse to the axis of the sleeve body may be formed at the outer surface, the wire portion being laterally clipped between the hook shaped portion and the outer surface of the sleeve body, with a free end of the hook gripping over the clipped wire portion at least partially.

BRIEF DESCRIPTION OF THE DRAWING

The invention will be described in more detail below with reference to the embodiments shown in the drawings.

DETAILED DESCRIPTION OF THE INVENTION

Figure 1:
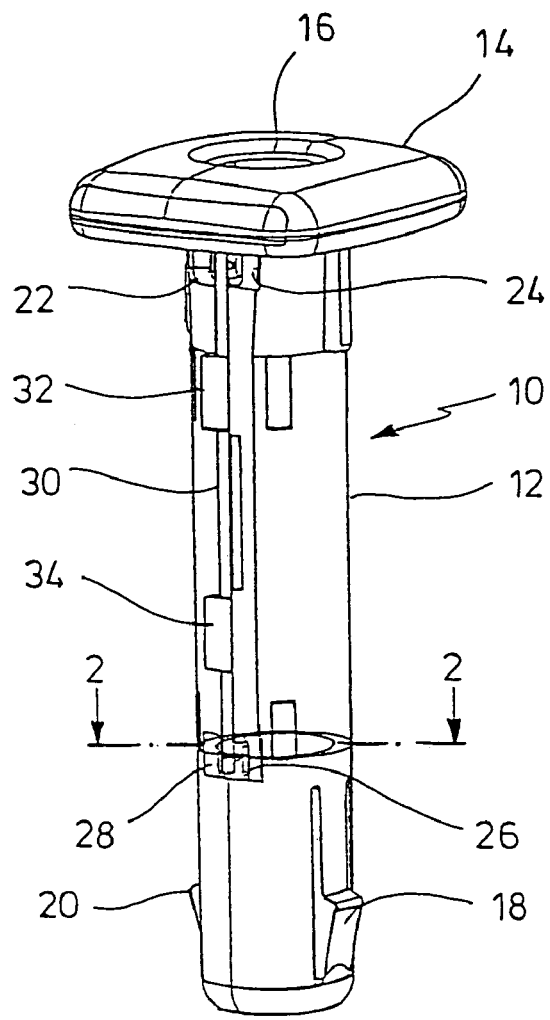
FIG. 1 shows a perspective view of a sleeve for a neck rest with a tolerance compensation for the inner diameter according to the invention.

In FIG. 1, a sleeve for a neck rest is shown comprising a sleeve body 10 which has a sleeve portion 12 and a head portion 14 which is radially expanded with respect to the sleeve portion 12. The head portion 14 has a through opening 16 which is aligned with the interior of the sleeve portion 12 for the reception of a bar of a neck rest, which fact is not shown in detail. The lower end of the sleeve portion 12 has opposed snap-in blades 18, 20 which cooperate with respective mating surfaces of a receptacle which is formed in the back rest of an automobile seat. This is not shown either.

In FIG. 1, it can be seen that a first resilient portion 22 is formed on below the head 14 and is located within an opening 24. A second resilient portion 26 is formed thereon at an axially parallel distance therefrom and is located within an opening 28.

Figure 2:
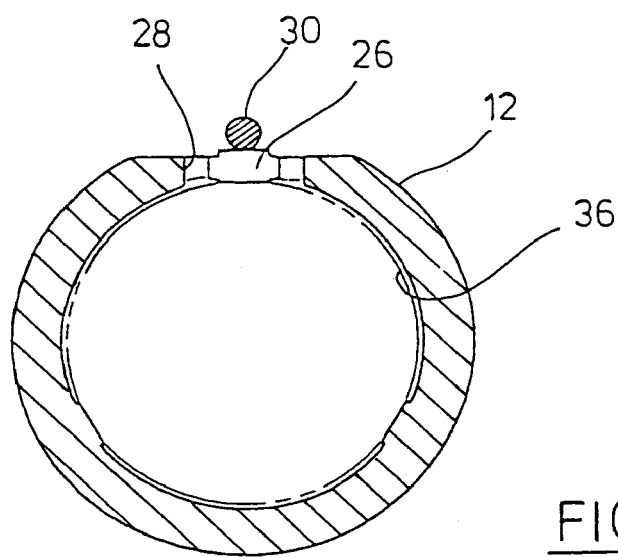
FIG. 2 shows a section through the representation of FIG. 1 along line 2-2.

FIG. 1 further allows to see a wire portion 30 which extends downwards from below the head 14 through a certain length parallel to the axis of the sleeve portion 12 at the outer side of the sleeve portion 12. The wire portion 30 is retained by means of two hook shaped portions 32, 34 which extend transversely to the axis of the sleeve portion 12 and are configured so as to clippingly grip over the wire portion 30. This way clippingly locates the wire portion 30 both in the sideward and axial directions. The upper and the lower end of the wire portion 30 extend at the outer side of the resilient portions 22, 26 as can be seen from FIG. 2. The wire portion 30 which is circular in cross-section is made of steel, for example. The resilient portion 26 and the arrangement of the wire portion 30 is such that if the bar of a neck rest is not received the resilient portion 26 projects slightly into the interior of the sleeve portion 12. The contour of the bar for a neck rest is outlined at 36. Thus, the inner side of the resilient portion 26 abuts against the bar 36 as it is appropriately biased by the wire portion 30.

Figure 3:
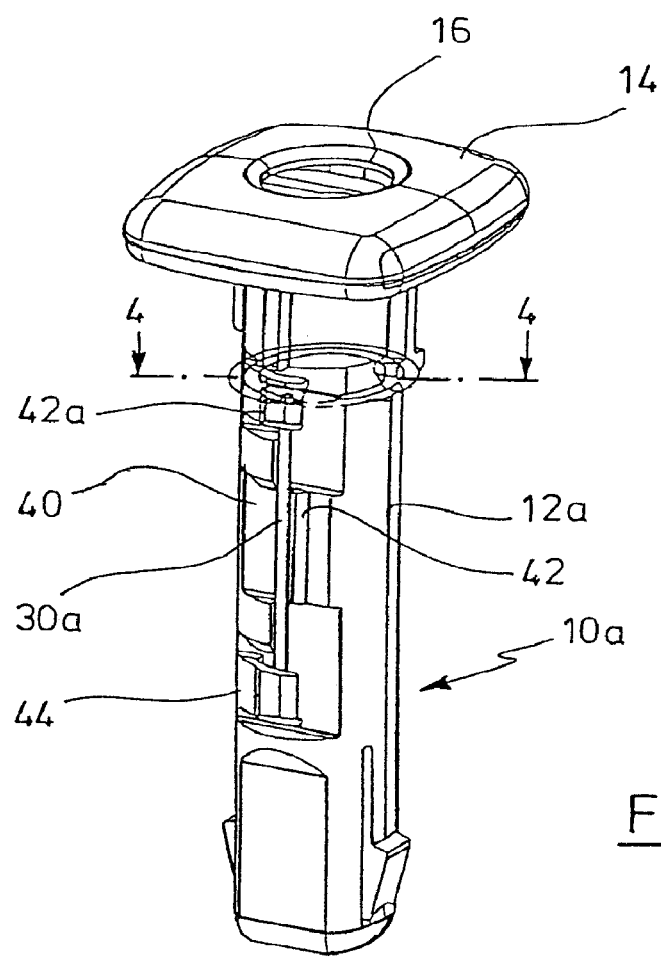
FIG. 3 shows a perspective view of a sleeve for a neck rest with a tolerance compensation for the outer diameter according to the invention.

The sleeve for a neck rest of FIG. 3 is largely the same as that of FIG. 1. Therefore, identical parts are given the same reference numbers to which an a is added. Again, a wire portion 30a can be seen which is clippingly located between two portions 40, 42, which fact is not shown in detail. Mounting the wire portion requires to clip it in between the portions 40, 42 the distance of which from each other is smaller than is the diameter of the wire portion 30a. This manner locates the wire portion 30a sufficiently in both the axial and sideward directions.

Figure 4:
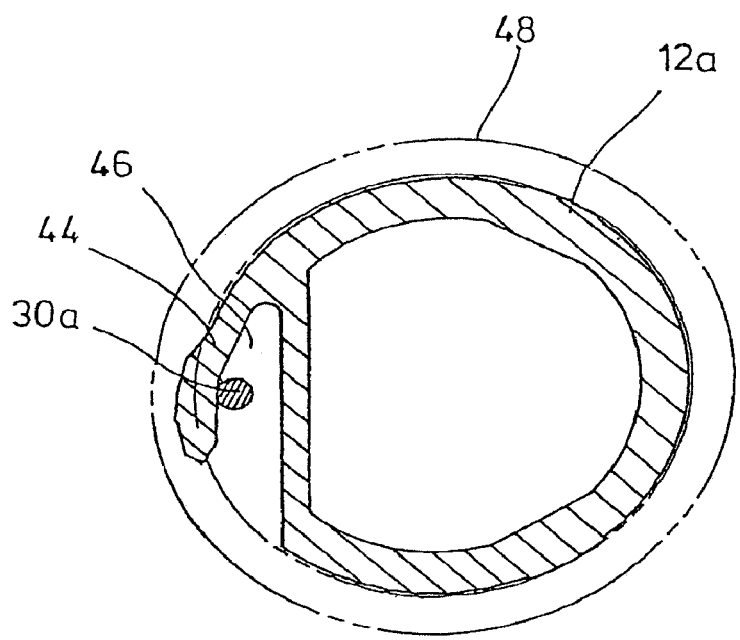
FIG. 4 shows a section through the representation of FIG. 3 along line 4-4.

The outer side of the sleeve portion 10a has formed thereto two resilient portions 42a, 44 which extend transversely to the axis of the sleeve portion 10a and, along with the outer side of the sleeve portion 12a, define a space as is shown at 46 in FIG. 4. The outer side of the portions 42a and 44 constitutes a bearing area on a respective receptacle for the sleeve portion 12a which is shown by a dash-and-dot line at 48 in FIG. 4. In the present case, the receptacle 48 is designed as a tubular body. FIG. 4 shows the position of the resilient portion 44 before the sleeve portion 12a is introduced into the receptacle 48. It can be recognized that the outer side of the resilient portion 44 projects beyond the inner side of the receptacle 48. When the sleeve portion 12a is introduced into the receptacle 48 the resilient portion 44 will be radially deformed inwards while overcoming the elastic force of the wire portion 30a.

The invention claimed is:

1. A sleeve for a neck rest with tolerance compensation, said sleeve comprising:
    a sleeve body defining a hollow interior for accommodating a rod of the neck rest, the sleeve body including at least one integrally formed resilient portion which is biased in a first direction; and
    a wire portion attached to the sleeve body along an axial direction of the sleeve body such that the wire portion is resiliently deflected in a second direction different from the first direction, the wire portion engaging the resilient portion;
    wherein the wire portion is parallel to the axial direction of the sleeve body.

2. The sleeve of claim 1, wherein the first and second directions are opposite radial directions of the sleeve body.

3. The sleeve of claim 1, wherein the sleeve body is of plastic material.

4. The sleeve of claim 1, wherein the wire portion is of resilient metal.

5. The sleeve of claim 1, wherein
    the resilient portion is biased outwardly away from the interior of the sleeve body; and
    the wire portion is resiliently deflected towards the interior of the sleeve body, the wire portion engaging an inner side of the resilient portion.

6. The sleeve of claim 5, comprising
    two said resilient portions which are spaced from each other in the axial direction of the sleeve body; and
    a single said wire portion which is attached to the sleeve body and has opposite end portions which engage the resilient portions, respectively.

7. The sleeve of claim 5, wherein the wire portion is fixedly clamped to the outer side of the sleeve body through at least a retaining portion integrally formed with the sleeve body.

8. The sleeve of claim 7, wherein
    the retaining portion includes at least one hook portion extending transverse to the axial direction of the sleeve body and being formed on an outer surface of the sleeve body; and
    the wire portion is laterally clipped between the hook portion and the outer surface of the sleeve body, with a free end of the hook portion at least partially gripping over the wire portion.

9. A sleeve for a neck rest with tolerance compensation, said sleeve comprising:
    a sleeve body defining a hollow interior for accommodating a rod of the neck rest, the sleeve body including at least one integrally formed resilient portion which is biased in a first direction; and
    a wire portion attached to the sleeve body along an axial direction of the sleeve body such that the wire portion is resiliently deflected in a second direction different from the first direction, the wire portion engaging the resilient portion;
    wherein the resilient portion is biased towards the interior of the sleeve body; and
    wherein the wire portion is attached to an outer side of the sleeve body to be resiliently deflected away from the sleeve body, the wire portion engaging an outer side of the resilient portion.

10. The sleeve of claim 9, comprising two said resilient portions which are spaced from each other in the axial direction of the sleeve body; and
    a single said wire portion which is attached to the sleeve body and has opposite end portions which engage the resilient portions, respectively.

11. The sleeve of claim 9, wherein the wire portion is fixedly clamped to the outer side of the sleeve body through at least a retaining portion integrally formed with the sleeve body.

12. The sleeve of claim 11, wherein
    the retaining portion includes at least one hook portion extending transverse to the axial direction of the sleeve body and being formed on an outer surface of the sleeve body; and
    the wire portion is laterally clipped between the hook portion and the outer surface of the sleeve body, with a free end of the hook portion at least partially gripping over the wire portion.

* * * * *